United States Patent
Carroll

(12) 
(10) Patent No.: US 6,530,019 B1
(45) Date of Patent: *Mar. 4, 2003

(54) DISK BOOT SECTOR FOR SOFTWARE CONTRACT ENFORCEMENT

(75) Inventor: Donald E. Carroll, Austin, TX (US)

(73) Assignee: Dell U.S.A., L.P., Austin, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/662,879

(22) Filed: Jun. 12, 1996

(51) Int. Cl.[7] .............................................. G06F 9/00
(52) U.S. Cl. ........................................................ 713/2
(58) Field of Search .............................. 360/60; 380/4; 364/200; 395/680, 186, 615, 25; 707/9; 713/1, 2, 200, 202; 705/59, 57, 55, 51

(56) References Cited

U.S. PATENT DOCUMENTS

| 4,740,890 A | * | 4/1988 | William ..................... 364/200 |
| 4,785,361 A | * | 11/1988 | Brotby ......................... 360/60 |
| 4,953,209 A | * | 8/1990 | Ryder et al. .................. 380/23 |
| 5,022,077 A | * | 6/1991 | Bealkowski et al. ........... 380/4 |
| 5,103,476 A | * | 4/1992 | Waite et al. .................... 380/4 |
| 5,212,729 A | * | 5/1993 | Schafer ......................... 380/4 |
| 5,371,792 A | * | 12/1994 | Asai et al. |
| 5,421,006 A | * | 5/1995 | Jablon et al. ........... 395/183.12 |
| 5,541,991 A | * | 7/1996 | Benson et al. ................. 380/4 |
| 5,553,143 A | * | 9/1996 | Ross et al. .................... 380/25 |
| 5,652,868 A | * | 7/1997 | Williams ..................... 395/500 |
| 5,671,412 A | * | 9/1997 | Christiano ................... 395/615 |
| 5,677,952 A | * | 10/1997 | Blakely et al. ................. 380/4 |
| 5,689,560 A | * | 11/1997 | Cooper et al. ................. 380/4 |
| 5,694,583 A | * | 12/1997 | Williams et al. ............ 395/500 |
| 5,752,004 A | * | 5/1998 | Blood ......................... 395/500 |
| 5,771,347 A | * | 6/1998 | Grantz et al. ............... 395/186 |
| 5,809,230 A | * | 9/1998 | Pereira ....................... 395/186 |
| 5,845,281 A | * | 12/1998 | Benson et al. ................. 707/9 |
| 5,933,497 A | * | 8/1999 | Beetchev et al. .............. 380/4 |
| 5,944,820 A | * | 8/1999 | Beelitz ........................... 713/1 |

* cited by examiner

*Primary Examiner*—Sue Lao
(74) *Attorney, Agent, or Firm*—Haynes and Boone, LLP

(57) ABSTRACT

Method and computer for implementing a technique that disables all the software on a disk until the user agrees to a software contract. In a departure from the art, the present invention modifies a boot record of the disk which contains the software to be protected. The boot record, which contains a loader code and disk partition data, is modified to make the rest of the disk virtually unusable or unreadable and to prompt the user for acceptance of the contract terms. If the user does accept the contract terms, the boot record is re-modified to contain conventional loader code as well as correct partition data. The computer is then rebooted and operates in a normal, conventional, manner.

20 Claims, 2 Drawing Sheets

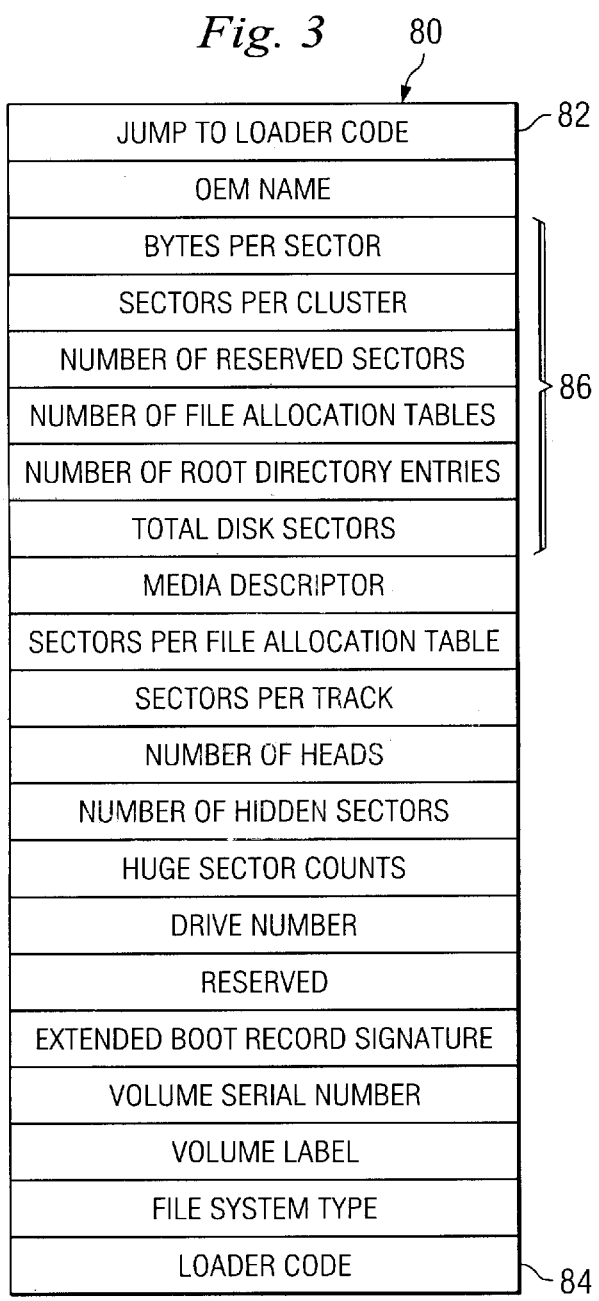
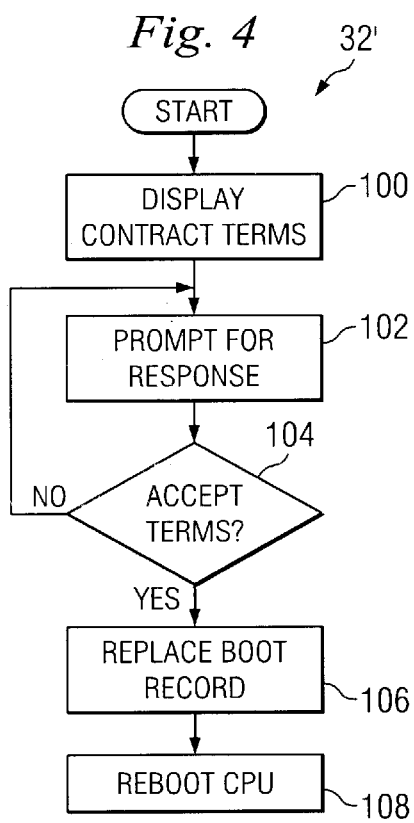

DISK BOOT SECTOR FOR SOFTWARE CONTRACT ENFORCEMENT

TECHNICAL FIELD

The invention relates generally to computer software and, more particularly, to a method for enforcing and verifying software contracts and/or copyright agreements by selectively disabling the disk on which the software resides.

BACKGROUND

Since their creation, personal computers (PCs) have enjoyed great commercial success and consumer acceptance. Likewise, computer programs, or software, have also enjoyed great commercial success and consumer acceptance. Despite this success, however, software makers have been plagued with software theft, or pirating. Although many factors contribute to the high amount of software pirating, one important factor is the lack of a contract between the software buyer and seller. If they exist, software contracts between buyers and sellers can be effective in many ways. For example, the contracts notify the buyer that software pirating is illegal. This not only informs the buyer who is ignorant of the copyright laws, but it also reminds the buyer who is trying to forget that pirating software is theft. Secondly, the software contract may serve as a valid contract in legal disputes.

Most aftermarket software includes a software contract. Typically, these contracts are wrapped around floppy disks or compact disks on which the software is stored. These contracts, commonly referred to as shrink-wrap licenses or shrink-wrap contracts, operate in such a manner that they prevent the buyer, or computer user, from accessing the software unless they agree to the contract. Typical language on shrink-wrap contracts may include

UPON OPENING THIS PACKAGE, THE USER AGREES TO THE TERMS INCLUDED HEREON

While shrink-wrap contracts work well with aftermarket software, they do not work well with software included with the purchase of a new computer or new hard drive. For example, most PCs can be purchased with a host of software, such as an operating system and various application programs, pre-loaded onto a hard drive. However, because the software is pre-loaded, there can not be a shrink wrap contract. Therefore, the user does not have to perform any physical activity, such as opening a package, to signify that he has seen the contract and accepts the terms included with the contract.

One solution to the above described problem is to include enforcement software that runs on the PC's operating system in order to protect the remaining pre-loaded software. The enforcement software displays the critical terms to a contract and prompts the user to accept the contract by typing something like "OK", "YES" or the like. If the user does accept the contract, he can utilize the pre-loaded software with the computer.

Although the above described solution works in many cases, it has several drawbacks that limit its effectiveness. For one, the enforcement software does not provide contract enforcement of the underlying operating system. Secondly, the enforcement software is very easy to circumvent. For example, if the PC is booted from a floppy disk, the operating system on the floppy disk can be used to access the pre-loaded software and thus circumvent the contract. Furthermore, when the PC is connected to a network, the pre-loaded software may be accessed through the network to another PC. In these ways, a user can access and use the pre-loaded software without ever accepting the software contract.

Therefore, what is needed is a software contract that can not be easily circumvented through floppy disk, network, or other simple means.

Furthermore, what is needed is a software contract that can also protect the underlying operating system.

SUMMARY

The foregoing problems are solved and a technical advance is achieved by a method and apparatus for implementing a technique that disables all the software on a disk until the user agrees to a software contract. In a departure from the art, the present disclosure modifies a boot record of the disk which contains the software to be protected. The boot record, which contains a loader code and disk partition data, is modified to make the rest of the disk virtually unusable or unreadable and to prompt the user for acceptance of the contract terms. If the user does accept the contract terms, the boot record is re-modified to contain conventional loader code as well as correct partition data. The computer is then rebooted and operates in a normal, conventional, manner.

A technical advantage achieved with the embodiment is that a software contract can not be easily circumvented through floppy disk, network, or other means.

Another technical advantage achieved with the embodiment is that a software contract can also protect the underlying operating system.

BRIEF DESCRIPTION OF THE DRAWINGS

FIG. 3 is a block diagram illustrating a floppy disk boot record for the PC of FIG. 1.

FIG. 4 is a flowchart of the operation of a modified loader code in the hard disk boot record of FIG. 2.

DETAILED DESCRIPTION OF THE PREFERRED EMBODIMENT

Figure 1:
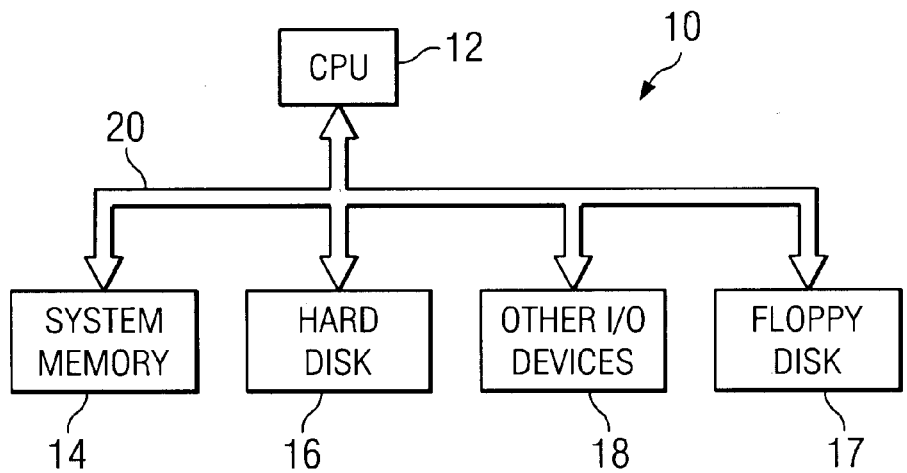
FIG. 1 is a block diagram of a PC for implementing features of the present invention.

Referring to FIG. 1, a personal computer (PC) capable of storing and utilizing software is designated by a reference numeral 10. The PC 10 comprises a central processing unit (CPU) 12, system memory 14, a hard disk 16, a floppy disk 17 and other I/O devices, collectively designated by a reference numeral 18, all interconnected via a bus 20. The system memory includes both random access memory (RAM) as well as read only memory (ROM). The ROM further includes a basic input-output system (BIOS) that is used by the CPU 12 to perform preliminary tasks and allows the CPU to locate and execute the operating system code stored in one of the disks 16 or 17 when the CPU first starts up, or "boots". The CPU 12 checks each disk, in order, to see if the disk is "bootable", i.e., the disk allows the CPU to load and execute an operating system stored thereon.

Figure 2:
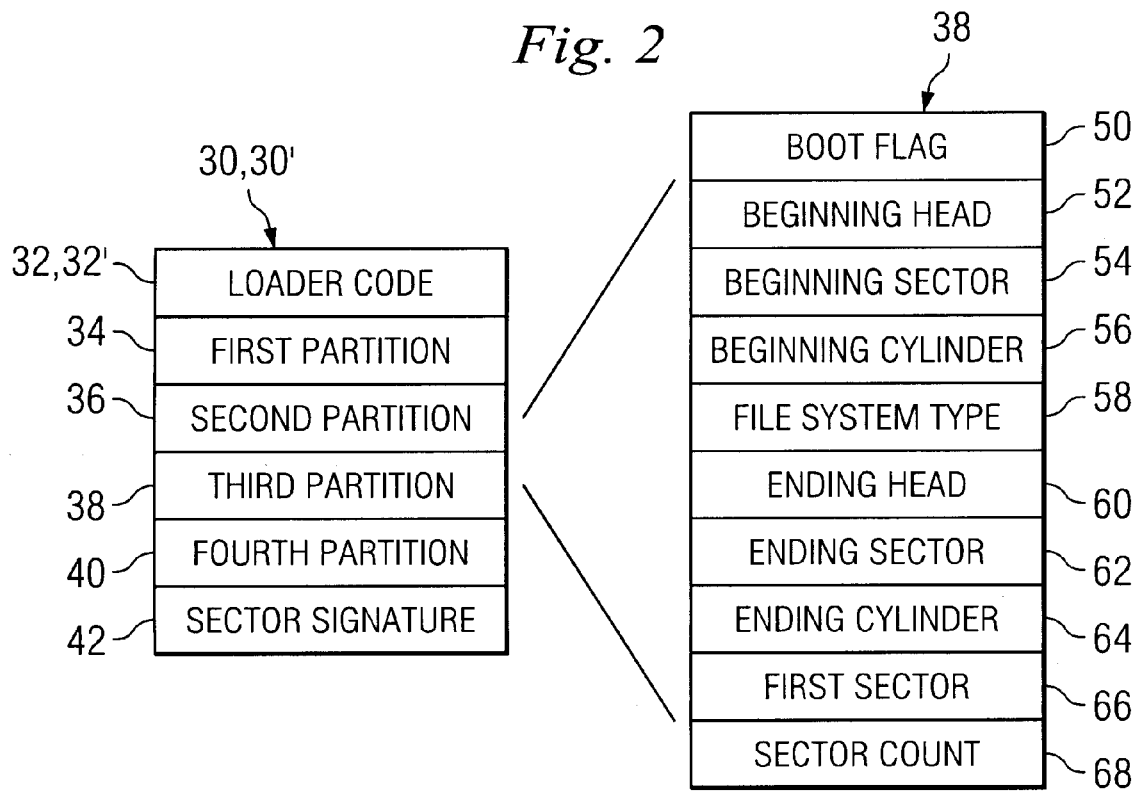
FIG. 2 is a block diagram illustrating a hard disk boot record for the PC of FIG. 1.

Referring to FIG. 2, the hard disk 16 contains many sectors of data, of which a boot record 30 is the very first sector regardless of whether the disk is bootable or not. It begins at a predefined, fixed address location, which in the preferred embodiment, is location 0. It will be appreciated that the format of the boot record 30 as shown is illustrative only. Different boot records apply to different computers and the present embodiment does not require any particular format of boot record with which to operate. The boot record 30 is divided into entries, including a loader code entry 32, a first partition entry 34, a second partition entry 36, a third partition entry 38, a fourth partition entry 40 and a partition sector signature 42.

When the CPU 12 first boots, the BIOS code directs the CPU to load and execute operating code stored in the loader code entry 32. The operating code stored in the loader code entry 32 instructs the CPU 12 where to look on the hard disk for the files for the operating system program. The operating code stored in the loader code entry 32 is modified by the present embodiment, as discussed in greater detail, below.

The remaining entries of the boot record give information about the disk format. Each of the partition entries 34, 36, 38 and 40 contain data that define an associated disk partition. For example, the third partition 38 is shown in detail and includes data such as a boot flag 50 for designating the hard disk as a bootable disk, a beginning head 52, a beginning sector 54 and a beginning cylinder 56 for describing the physical location on the hard disk 16 of where the third partition begins. Furthermore, the third partition 38 includes an ending head 52, an ending sector 54 and an ending cylinder 56 for describing the physical location on the hard disk 16 of where the third partition ends, and descriptors for the first sector 66 and the number of sectors 68. Likewise, the first, second and fourth partition entries 34, 36 and 40, respectively, contain similar information describing each. The data for each partition allows devices to correctly read any software located in one of the partitions.

Referring to FIG. 3 a block diagram of a boot record 80 for the floppy disk 17 is similar to the boot record 30, described above. The differences between the two boot records are minor. For example, instead of a loader code entry at the first position, the boot record 80 includes a jump instruction 82. The jump instruction 82 provides an address for a loader code entry 84, located in a different location. Furthermore, since the floppy disk 17 typically has only one partition, the boot record 80 includes only data 86 similar to one of the disk partition entries described in FIG. 2. Therefore, it is understood that the present embodiment may be easily implemented on many different storage devices, such as the floppy disk 17, and for the sake of brevity, specific implementations of the present embodiment on other storage devices will not be further discussed.

The present embodiment utilizes two separate boot records for the hard drive 16. A first boot record, hereinafter designated as the conventional boot record 30, is a boot record as described above. An understanding of the actual values for the data stored in the conventional boot record 30 is not necessary for the present embodiment. Instead, all that is required is that the conventional boot record 30 includes conventional boot code and is in a format required by the CPU, such formats being well understood by those of ordinary skill in the art.

When the hard disk 16 is first sold or delivered to the user, a second boot record, hereinafter designated as the modified boot record 30', is used. The modified boot record 30' has several differences with the conventional . boot record 30 described above. First of all, the modified boot record 30' comprises a modified loader code entry 32'. Therefore, the modified loader code entry 32' is executed the first time the user can use the hard disk 16, as discussed in greater detail, below. Secondly, the modified boot record 30' has incorrect data stored in the partition entries 34, 36, 38, 40, and 42. The incorrect data may be all zeros, or no-operation instructions, or other similar data. By placing incorrect data in each of the entries 34, 36, 38, 40, and 42, the data stored on the remaining sectors of the hard disk 16 is unusable. For example, even if the CPU is booted from the floppy disk 17, the CPU can not comprehend the data from the remaining sectors of the hard disk 16 because the boot record 30' is full of incorrect data. Furthermore, although some disk repair utility programs may be able to remotely change the modified boot record 30' to include the correct entry data, as in the conventional boot record 30, the expertise to correctly change the entry data is rare and the process is very time consuming. Therefore, the data stored on the rest of the hard disk 16 is, for all intents and purposes, unusable.

Referring to FIG. 4, the modified loader code entry 32' comprises operating code that is compatible with the CPU 12 and capable of performing the steps described below. Furthermore, some of the operating code for performing the steps describe below may be located outside of the modified loader code entry 32'. For example, terms of a software contract to be accepted by the user before he can use the hard disk 16 may be stored on the hard disk but outside of the modified loader code entry 32'.

In step 100, the terms of the software contract are sent to one of the I/O devices 18. In the preferred embodiment, the terms are displayed on a computer monitor (not shown), but other I/O devices may also be used. At step 102, the user is prompted to indicate acceptance of the contract terms. At step 104, a determination is made as to whether the user accepted the contract terms. Indication of acceptance by the user is received through one of the I/O devices 18, such as a keyboard (not shown). If at step 104, a determination is made that the user did not accept the contract terms, execution loops back to step 102. In so doing, an endless loop is formed in the modified loader code 32'. Furthermore, because the remaining entries of the modified boot record 30' are still full of incorrect data, the only usable data of the hard disk 16 is that which comprises the endless loop describe above.

If at step 104 the user does accepts the contract terms, execution proceeds to step 106. At step 106, the conventional boot record 30 is written over the modified boot record 30'. In an alternate implementation, the step 106 may also log a time at which the user accepted the contract terms to the hard disk 16. At step 108, the CPU 12 is rebooted. In so doing the CPU 12 can now boot in a normal, conventional manner using the conventional boot record 30 with the conventional loader code 32. Furthermore, there is now evidence that the user accepted the contract terms.

Various implementations can be used by the present embodiment. For example, the incorrect data stored in the entries 34, 36, 38, 40 and 42 can be the correct, conventional data, except that one bit has been inverted. In so doing, step 106 (FIG. 4) may comprise the simple step of inverting the bit of each data in the entries 34, 36, 38, 40 and 42. In another implementation, the modified loader code entry 32' may comprise a jump instruction to another location in the hard disk 16 where the rest of the loader code is stored. In this way, when the modified loader code entry 32' is changed to the conventional loader code entry 32 in step 106, the only requirement is to remove and replace the jump instruction. This implementation also works well with the floppy disk boot record 80.

Therefore, it is understood that the present disclosure can take many forms and embodiments. The embodiments shown herein are intended to illustrate rather than to limit the invention, it being appreciated that variations may be made without departing from the spirit or the scope of the invention. Furthermore, although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. In a computer comprising a processor electrically connected to a bootable storage device including a partition, a method for obtaining a user response before the partition can be utilized, the method comprising:

modifying a first entry of a boot record of the storage device to include code for obtaining the user response;

modifying a second entry of the boot record corresponding to the partition to contain incorrect data, thereby rendering the partition unreadable;

upon startup of the processor, executing the code for obtaining the user response;

upon receipt of a positive user response, removing the code for obtaining the user response from the first entry of the boot record and modifying the second entry of the boot record to contain correct data, thereby rendering the partition readable.

2. The method of claim 1 further comprising the step of rebooting the processor.

3. The method of claim 1 wherein the incorrect data is the correct data with one or more bits modified.

4. The method of claim 1 wherein the user response represents acceptance to a software contract or license.

5. The method of claim 1 wherein the boot record contains data for locating software.

6. The method of claim 1 wherein the user response is stored in the storage device.

7. The method of claim 6 wherein a time of the receipt of the user response is stored.

8. A method for receiving acceptance by a user of contract terms for software stored in a predefined area on a storage device for use by a processor, the method comprising:

modifying a boot record of the storage device to render the predefined area unreadable by storing incorrect data in an entry of the boot record corresponding to the predefined area;

including in the boot record code to be run by the processor for prompting the user for acceptance of the contract terms;

upon receipt of acceptance by the user, re-modifying the boot record to make the predefined area readable by storing correct data in the entry of the boot record corresponding to the predefined area.

9. The method of claim 8 further comprising recording the acceptance to the storage device.

10. The method of claim 8 wherein the storage device is a hard disk.

11. The method of claim 8 wherein the modifying the boot record and the including code are done before the storage device is received by the user.

12. The method of claim 8 wherein data for re-modifying the boot record is stored on the storage device.

13. The method of claim 1 wherein the partition includes software that is usable only when the partition is readable.

14. The method of claim 8 wherein the software is unusable when the predefined storage area is unreadable.

15. A system comprising:

a computer system that includes a storage device that stores code and a boot record;

the boot record including a first entry associated with a partition, the first entry including first information that makes the partition unreadable by the computer system;

the code processable by the computer to cause the computer system to:

prompt a user for acceptance of one or more terms; and replace the first information in the first entry with second information that makes the partition readable by the computer system in response to the user accepting the one or more terms.

16. The system of claim 15, wherein the partition includes software that is processable by the computer system in response to the partition being readable by the computer system.

17. The system of claim 15, wherein the partition includes software that is not processable by the computer system in response to the partition being unreadable by the computer system.

18. The system of claim 15, wherein the boot record includes a second entry that includes an address associated with the code, and wherein the code is processable by the computer to cause the computer system to modify the second entry in response to the user accepting the one or more terms.

19. The system of claim 15, wherein the boot record includes a second entry that includes the code, and wherein the code is processable by the computer to cause the computer system to modify the second entry in response to the user accepting the one or more terms.

20. The system of claim 15, wherein the bootable storage device comprises a hard disk.

* * * * *